United States Patent
Guru et al.

(10) Patent No.: US 9,342,540 B2
(45) Date of Patent: May 17, 2016

(54) METHOD AND SYSTEM FOR CREATING AND MAINTAINING UNIQUE DATA REPOSITORY

(71) Applicant: Tata Consultancy Services Limited, Mumbai (IN)

(72) Inventors: Nishant Guru, Pune (IN); Amit Prakash, Pune (IN); Arjun Ojha, Pune (IN); Garima Aima, Pune (IN)

(73) Assignee: Tata Consultancy Services Limited (IN)

( * ) Notice: Subject to any disclaimer, the term of this patent is extended or adjusted under 35 U.S.C. 154(b) by 246 days.

(21) Appl. No.: 13/851,380

(22) Filed: Mar. 27, 2013

(65) Prior Publication Data
US 2014/0195494 A1    Jul. 10, 2014

(30) Foreign Application Priority Data
Jan. 8, 2013   (IN) .............................. 64/MUM/2013

(51) Int. Cl.
G06F 17/30        (2006.01)
(52) U.S. Cl.
CPC ...... *G06F 17/30303* (2013.01); *G06F 17/3015* (2013.01); *G06F 17/30115* (2013.01); *G06F 17/30156* (2013.01); *G06F 17/30162* (2013.01); *G06F 17/30498* (2013.01)
(58) Field of Classification Search
CPC ................................................. G06F 17/30303
USPC ......................................................... 707/692
See application file for complete search history.

(56) References Cited

U.S. PATENT DOCUMENTS

| | | | |
|---|---|---|---|
| 5,978,791 A * | 11/1999 | Farber et al. .................. | 707/640 |
| 6,012,062 A | 1/2000 | Jagadish et al. | |
| 6,073,140 A * | 6/2000 | Morgan et al. | |
| 6,615,220 B1 * | 9/2003 | Austin et al. | |
| 6,912,549 B2 * | 6/2005 | Rotter et al. | |
| 7,392,240 B2 * | 6/2008 | Scriffignano et al. | |
| 8,051,049 B2 | 11/2011 | Remington et al. | |
| 8,078,651 B2 * | 12/2011 | Desai et al. ................... | 707/812 |
| 8,271,477 B2 * | 9/2012 | Sood et al. ..................... | 707/713 |

(Continued)

FOREIGN PATENT DOCUMENTS

| | | |
|---|---|---|
| EP | 0794530 A2 | 9/1997 |
| EP | 1145180 A2 | 10/2001 |

(Continued)

OTHER PUBLICATIONS

Christie I. Ezeife and Timothy E. Ohanekwu, "Use of Smart Tokens in Cleaning Integrated Warehouse Data" Internatioanl Journal of Data Warehousing & Mining, 1(2), 1-22, Apr.-Jun. 2005.

(Continued)

*Primary Examiner* — Rehana Perveen
*Assistant Examiner* — Hicham Skhoun
(74) *Attorney, Agent, or Firm* — Finnegan, Henderson, Farabow, Garrett & Dunner, LLP (57) ABSTRACT

In accordance with the disclosure, there is provided a system and method for creating and maintaining unique data repository comprising a matching process based on a set of predefined matching conditions and thereon performing an action type corresponding to the outcome of matching process. The present disclosure provides for real time data de-duplication and updation of unique data repository to obtain a unified view of unique and matching records.

5 Claims, 6 Drawing Sheets

(56) References Cited

U.S. PATENT DOCUMENTS

| | | | |
|---|---|---|---|
| 8,374,986 B2* | 2/2013 | Indeck | G06N 5/025 370/329 |
| 8,930,383 B2* | 1/2015 | Dekker et al. | 707/758 |
| 2005/0187794 A1 | 8/2005 | Kimak | |
| 2011/0219034 A1 | 9/2011 | Dekker et al. | |
| 2014/0164378 A1* | 6/2014 | Levandoski et al. | 707/737 |

FOREIGN PATENT DOCUMENTS

| | | |
|---|---|---|
| EP | 1966729 A2 | 9/2008 |
| EP | 2529298 A1 | 12/2012 |

OTHER PUBLICATIONS

Marco Modesto, Mois'Es G. De Carvalho, and Walter Dos Santos, "Record Deduplication By Evolutionary Means" Departamento de Ciˆ encia da computac, Universidade Federal de Minas Getais.

A Faritha Banu and C. Chandrasekar, "An Optimized Approach of Modified BAT Algorithm to Record Deduplication" International Journal of Computer Applications (0975-8887), Jan. 2013, vol. 62-No. 1.

A Faritha Banu and C. Chandrasekar, "A Survey on Deduplication Methods" International Journal of Computer Trends and Technology, 2012, vol. 3 issue 3.

Leroy Jones and Walter Sujansky "Patient Data Matching Software: A Buyer's Guide for the Budget Conscious" California Healthcare Foundation, ihealth report, Aug. 2004.

The University of The State of New York, The State Education Department "New York State Student Information Repository System and New York State Student Identification System (NYSSIS) Users Guide."

* cited by examiner

METHOD AND SYSTEM FOR CREATING AND MAINTAINING UNIQUE DATA REPOSITORY

CROSS-REFERENCE TO RELATED PATENT APPLICATION

The present application claims priority under 35 U.S.C. §119 to Indian Patent Application No. 64/MUM/2013, filed Jan. 8, 2013. The aforementioned application is incorporated herein by reference in its entirety.

TECHNICAL FIELD

The invention relates to the field of data matching process environment, and more particularly, but not by way of limitation, one or more embodiments of the invention enable systems and methods of matching similar data objects to create a unique data repository.

BACKGROUND

Present business scenario poses formidable challenges in creating and maintaining single index for the entire stream of records that a repository can house. For example, an organization having huge employee list where each employee have a different representation of his/her record maintained across enterprise-wide department computer systems may lead to an enormous amount of undesirable duplication—wasting of storage resources. Thus for organizations that house such data in multiple repositories, obtaining a unified view of a unique data, a data that should probably be merged into one object to create a one unique record, is quiet a tedious task.

In existing implementations, creating a unified version of data, to say, a master data has been attempted, but the effort expended in managing quality of voluminous data records along with maintaining an optimal speed of data-duplication for determining the correct match dwarfed the significance of such attempt. Existing solutions have observed difficulty in integrating different master data models since the chance of master data getting trapped in different systems was typically high.

Furthermore, the constraint of real time identification of previous records to gauge and eliminate the duplicate ones, effected accuracy of systems, costs and performance of business units. In summary, existing computer systems and methods lack effective mechanisms for performing data matching in a way that allows the system to utilize actions associated with the data objects, to determine duplicity of records. Because of the limitations described above there is a need for a cost effective and viable system and method to match similar master data records in real time and thereon present a unified view of such data.

SUMMARY

The present disclosure is directed to systems and corresponding methods facilitating creation and maintenance of unique data repository by employing a matching process based on a set of predefined matching conditions, and thereon applying the desired action type corresponding to the outcome of the matching process. The process enables elimination of duplicate and redundant data records in real time thereby providing the end user with the most updated and unique version of the repository.

In one aspect, the present invention provides a method for managing and updating a data repository in real time, where the method comprises of:

retrieving at least one record from a stream of incoming records maintained in a load repository for matching the retrieved record with a previous record history maintained in a detail repository based on a first uniquely identifying matching key;

performing upon the retrieved record a sequence of matching runs executable on a parallel processing engine, said matching runs further comprising:

a) matching the incoming record against a set of records maintained along with their second associated unique identifier in a master repository, said matching based upon a set of predefined matching conditions, and performing thereupon a combination of one or more suited action type predefined for each possible matching result;

b) for records found non matching in step a, iteratively performing a matching process between the non matching records and image records, said matching based upon a set of predefined matching conditions and performing thereupon a combination of one or more suited action type predefined for the each possible matching result;

c) for records found non matching in steps a and b, iteratively performing a self join matching process between the records of the load repository, said matching based upon a set of predefined matching conditions and performing thereupon a combination of one or more suited action type predefined for the each possible matching result;

d) for the records found non matching in steps a, b and c, identifying for remaining similar matched records based on a criterion; and in response to the action types performed corresponding to the each matching run, updating each of the master and detail repositories thereby providing a unique and updated record for all matching records in the data repository.

In another aspect, a system for managing and updating a unique data repository in real time is provided, the system comprising:

a load repository configured to store a stream of records generated from plurality of devices, each of the incoming record being associated with a first uniquely identifying matching key;

a parallel processing system for retrieving at least one record from the load repository and performing thereupon a sequence of matching runs and coordinating with a master repository that is configured to consolidate and store a set of matching records obtained from the matching run along with a corresponding second unique identifier, wherein said matching runs further comprising:

a) matching the incoming record against a set of records maintained in a master repository, said matching based upon a set of predefined matching conditions and performing thereupon a combination of one or suited action type predefined for each possible matching result;

b) for records found non matching in step a, iteratively performing a matching process between the non matching records and image records, said matching based upon a set of predefined matching conditions and performing thereupon a combination of one or more suited action type predefined for each possible matching result;

c) for records found non matching in steps a and b, iteratively performing a self join matching process between the records of the load repository, said matching based upon a set of predefined matching conditions and performing thereupon a combination of one or more suited action type predefined for each possible matching result;

d) for the records found non matching in steps a, b and c, identifying for remaining similar matched records based on a criterion; and a detail repository configured to store all the incoming records along with the first uniquely identifying matching key and the second unique identifier.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

Features, elements, and aspects that are referenced by the same numerals in different figures represent the same, equivalent, or similar features, elements, or aspects, in accordance with one or more embodiments.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred systems and methods are now described.

One or more components of the invention are described as module for the understanding of the specification. For example, a module may include self-contained component in a hardware circuit comprising of logical gate, semiconductor device, integrated circuits or any other discrete component. The module may also be a part of any software program executed by any hardware entity, for example processor. The implementation of module as a software program may include a set of logical instructions to be executed by the processor or any other hardware entity. Further a module may be incorporated with the set of instructions or a program by means of an interface.

Figure 1:
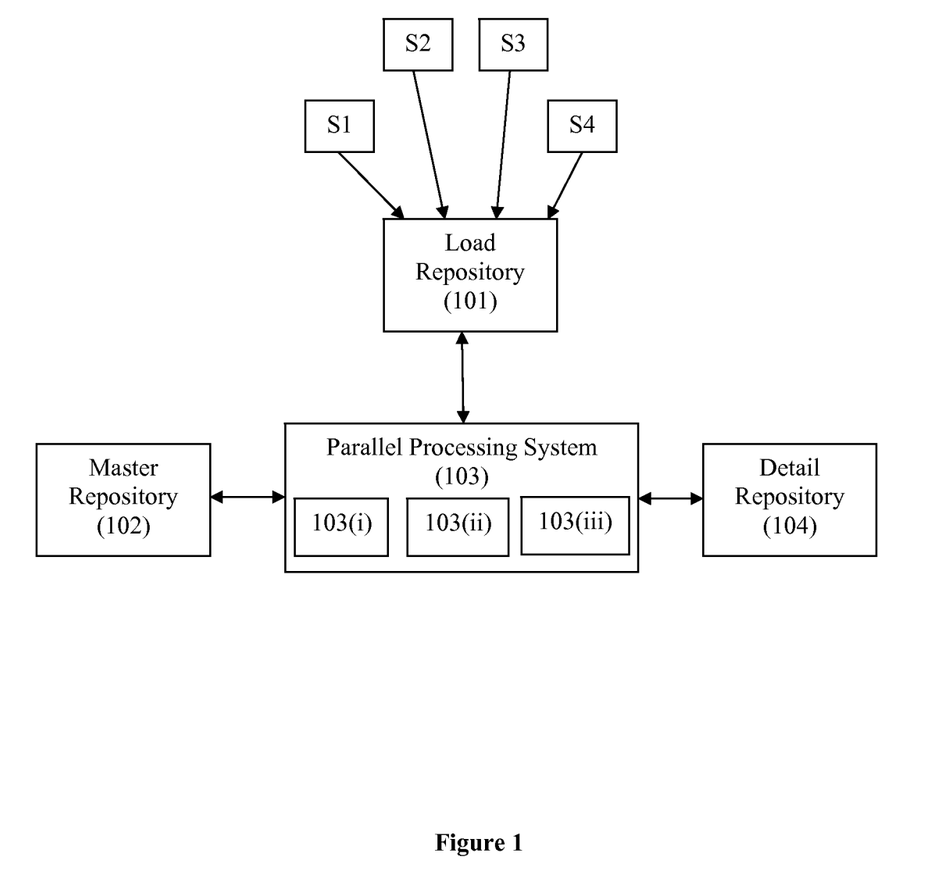
FIG. 1 illustrates a system architectural diagram of unique data repository creation and management according to an embodiment of the invention.

Referring to FIG. 1, in accordance with one embodiment, an exemplary data processing environment comprises of a network of one or more devices (S1, S2, S3, S4 . . . ) generating a stream of data records, a load repository 101 for storing the incoming data set, a parallel processing system 103 for executing the matching process; a master repository 102 for storing records consolidated after the de-duplication and matching process and a detail repository 104 for storing the entire data history along with the matching records.

In one embodiment, the ever coming data set is obtained from plurality of sources (S1, S2, S3, S4 . . . ) and reposited in a Load repository 101 that is configured to uniquely identify each incoming record by a field, named dc_primary_key. These records fetch their field values from the sources they are obtained from.

The records contained in a Load repository 101 are then subjected to matching process by the parallel processing system 103 based on a set of matching criteria, and the duplicate records removed. This uniquely creates only one entry for each record that subsequently gets stored in the master repository 102. The master repository 102 is thus configured to consolidate all matching records and create one unique entry for each matching record. Each master record herein gets uniquely identified by a field, named dc_unified_id and the corresponding fields values are retrieved from the processing engine that continuously eliminate the duplicate entry.

Next, the detail repository 104 of the system reposits all the incoming records that ever arrived for processing along with the uniquely identified id vis a vis dc_unified_id of the corresponding matched record contained within the master repository 102.

Figure 2:
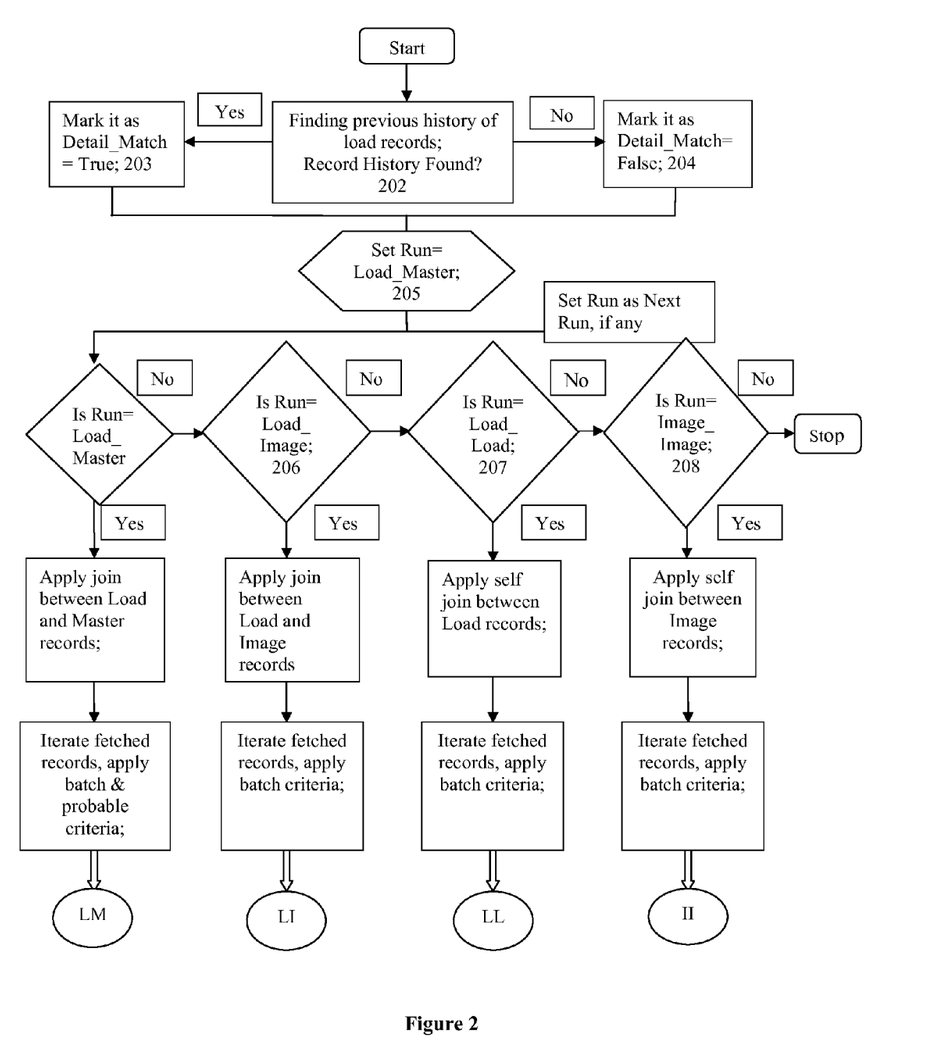
FIG. 2 illustrates flow chart depicting an overall process for creation and management of unique data repository, in accordance with an embodiment of the invention.

Referring now to FIG. 2, in accordance with one embodiment, the matching process applied upon the data fetched from the load repository 101 is illustrated. In one implementation, the matching process is determined to constitute of four matching runs, each run catering to specific matching scenario required for completing the matching process. These Matching Runs are executed sequentially and the outcome of one Matching Run is a pre-condition (input) for the next Matching Run.

In one exemplary embodiment, the invention describes a set of matching criteria's that shall be met for records to be found matching. The criteria involves a matching algorithm that takes two set of records as input, perform the matching process thereon and returns the match percentage between the specified fields of records. The two records, for example, are considered to be matched if they satisfy one of the matching criteria. These matching criteria are further based upon three different matching conditions that govern the extent of matching criteria to be fulfilled.

The other exemplary embodiment discusses the three matching conditions that are ascertained during the matching process, as given below:

a) Detail_Match: This requires the incoming record to have previous history existing in the Detail Repository 104. To clarify, it requires matching of dc_primary_key values in the Detail record for the incoming record.

b) Master_Match: Here, the incoming record should match with any record from the Master Repository 102. This condition requires satisfying any of the given Matching Criteria or condition with a record in Master Repository for the incoming record.

c) Same_Master: This requires satisfying both of the above matching conditions i.e. Detail_Match and Master_Match, to be applicable. In other words, the currently matched master record's dc_unified_id value and the previously linked dc_unified_id value should be the same.

Based upon the matching conditions discussed above, an embodiment of the present disclosure applied two matching criteria for the matching run, namely Batch Criteria and the Probable Criteria. Whereas the Batch criteria is more stringent and requires exact matching of records based on defined matching rules and conditions, the Probable criteria is usually less stringent and represents matching of records less likely similar, basically for probable record identification. Additionally, the Matching Criteria also includes Filter Clause, a condition on which probable records are selected from Master Repository for applying the Matching algorithms.

Re-referring to FIGS. 1 & 2, before a matching run begins to execute, the records of the Load repository 101 are searched for any of their previous history, if existing in the detail repository 104 by matching the field values of dc_primary_key, as shown in Step 202 of FIG. 2. If a record's history is found in the Detail repository 104, the DETAIL_MATCH condition (flag) is marked true for that record and its linked MASTER record's unified_id is stored in Prey_Unified_Id as in step 203. On the contrary, if the record's history is not found, the DETAIL_MATCH condition (flag) is stored as false, shown in step 204.

After checking the history of all the records, the Matching Runs are executed sequentially. After a run completes, the control returns back to its source (J1), for processing remaining runs, if any. In accordance with one preferred embodiment of the present disclosure, these matching runs are defined as:

a) Load_Master Run
b) Load_Image Run
c) Load_Load Run
d) Image_Image Run

However, before discussing each of these matching runs in detail, it is also important to understand which action type is to be performed in response to the outcome of matching process. It shall however be acknowledged that the present disclosure enables, via its parallel processing engine 103, to run the matching process and accordingly chose the action type in real time such that the repository being maintained of unique records gets updated with the most latest version of record.

The preferred embodiment of the present disclosure presents five major action types that are performed in response to the instructions received from the processing engine performing the matching process, these action types are: Update Action, Auto_Merge Action, Auto_Consolidate Action, Update_New Action and New Action Type. Let's review each of these action types briefly along with, but not limiting to, scenario specific examples:

a) UPDATE:
Condition:
The following matching conditions and their outcomes are considered for this Action Type.
Detail_Match: Satisfied
Master_Match: Satisfied
Same_Master Satisfied Action:
The following actions are performed on the matching repositories:
1. Update the record in Detail-Repository 104 whose dc_primary_key matches with that of the incoming record.
2. Update the record in Master-Repository 102 that has the best-match with the incoming record.

Example:
The given example describes the scenario in which Update Action Type is applied and corresponding actions are performed.

Pre-Action Repositories Contents:
Load-Repository:

| dc_primary_key | Name | City |
| --- | --- | --- |
| 1 | Amit | Pune |

Detail-Repository:

| dc_primary_key | dc_unified_id | Name | City |
| --- | --- | --- | --- |
| 1 | 1001 | Amit | Nagpur |

Master Repository:

| dc_unified_id | Name | City |
| --- | --- | --- |
| 1001 | Amit | Nagpur |

Action:
The incoming record matches with the record from Master-Repository 102 on the basis of Name field (Amit) and the record's dc_primary_key (1) matches with that of a record in Detail-Repository 104. The dc_unified_id (1001) of matched record from Master-Repository is the same as dc_unified_id (1001) of matched record from Detail-Repository. Since conditions Detail_Match, Master_Match and Same_Master are satisfied, this constitutes the case of UPDATE Action Type.

An existing customer, Amit has changed his city from Nagpur to Pune and his latest record has come for consolidation. The Detail-Repository and Master-Repository records are updated with the contents of the incoming record. Thus the value of city field changes from Nagpur to Pune in both the repositories.

Post-Action Repository Contents:
Detail-Repository:

| dc_primary_key | dc_unified_id | Name | City |
| --- | --- | --- | --- |
| 1 | 1001 | Amit | Pune |

Master-Repository:

| dc_unified_id | Name | City |
| --- | --- | --- |
| 1001 | Amit | Pune |

There are, however, a certain set of update conditions that determine whether or not the fields of record in Master Repository should be updated with the corresponding values of Load Repository record. While the As_of_Date condition is applied on the entire record, rest of the update conditions can be applied on any field of record. The update conditions are:

As_of_date: If the record from Load repository is of the latest or same date as compared to the record matched from the master repository, then any field condition is applicable else none of the conditions is applicable.

Update_If_Incoming_Not_Null: The record is not updated if the record from Load repository has a null value for the corresponding field.

Update_If_Existing_Null: The record gets updated if the matched record from the master repository has null value for that field.

Update_Always: It requires always updating of the field value

Never_Update: Never updation of the field value.

b) AUTO_MERGE:
Condition:
The following conditions and their outcomes are considered for this Action Type.
Detail_Match: Satisfied
Master_Match Satisfied
Same_Master Not Satisfied
Action:
The following actions are performed on the matching repositories:
1) Update the record in Detail-Repository whose dc_primary_key matches that of the incoming record.
2) Update the record in Master-Repository which has got the best-match, with the incoming record. If the previously linked Master record has got no other corresponding record in Detail-Repository, mark it as inactive record.

Example:
The given example describes the scenario in which Auto_Merge Action Type is applied and corresponding actions are performed.

Pre-Action Repositories Contents:
Load-Repository:

| dc_primary_key | Name | City |
|---|---|---|
| 1 | Arjun | Indore |

Detail-Repository:

| dc_primary_key | dc_unified_id | Name | City |
|---|---|---|---|
| 1 | 1001 | Amit | Pune |
| 2 | 1002 | Arjun | Khandwa |

Master-Repository:

| dc_unified_id | Name | City |
|---|---|---|
| 1001 | Amit | Pune |
| 1002 | Arjun | Khandwa |

Action:
The incoming record matches with the record from Master-Repository 102 on the basis of Name field (Arjun) and the record's dc_primary_key (1) matches with that of a record in Detail-Repository. As can be seen from the table above, while the detail repository stores dc_primary_key as 2 for name Arjun, the incoming record reports the dc_primary_key as 1 for Arjun. Furthermore, from the records of Load repository, it is evident that since the dc_primary_key for Arjun is 1, the corresponding dc_unified_id should have been 1001, which is but recorded as 1002 in Master repository. Since the conditions Detail_Match, Master_Match are satisfied, but the condition. Same_Master is not satisfied, this is the case of AUTO_MERGE Action Type.

An existing customer, Amit has transferred his record to Arjun, so the record with dc_primary_key 1 in Detail-Repository, belonging to Amit gets updated with the Arjun's incoming record. It also gets linked to record from Master-Repository with dc_unified_id 1002, belonging to Arjun.

The Detail-Repository and Master-Repository records are updated with the contents of the incoming record. The value of city field changes from Khandwa to Indore in both the repositories. Amit's record in Master-Repository is marked inactive, as no other record from Detail-Repository is linked to it.

Post-Action Repository Contents:
Detail-Repository:

| dc_primary_key | dc_unified_id | Name | City |
|---|---|---|---|
| 1 | 1002 | Arjun | Indore |
| 2 | 1002 | Arjun | Khandwa |

Master-Repository:

| dc_unified_id | Name | City |
|---|---|---|
| 1001 | Amit | Pune |
| 1002 | Arjun | Indore | c) AUTO_CONSOLIDATE
Condition:
The following conditions and their outcomes are considered for this Action Type.
Detail_Match: Not Satisfied
Master_Match: Satisfied
Action:
The following actions are performed on the matching repositories:
1. Add the incoming record to Detail-Repository.
2. Update the record in Master-Repository which has got the best-match, with the incoming record.

Example:
The given example describes the scenario in which Auto_Consolidate Action Type is applied and corresponding actions are performed.

Pre-Action Repositories Contents:
Load-Repository:

| dc_primary_key | Name | City |
|---|---|---|
| 2 | Amit | Pune |

Detail-Repository:

| dc_primary_key | dc_unified_id | Name | City |
|---|---|---|---|
| 1 | 1001 | Amit | Nagpur |

Master-Repository:

| dc_unified_id | Name | City |
|---|---|---|
| 1001 | Amit | Nagpur |

Action:

The incoming record matches with the record from Master-Repository on the basis of Name field (Amit) and the record's dc_primary_key (2) does not match with any record in Detail-Repository. Since the condition Master_Match is satisfied but the condition Detail_Match is not satisfied, this is the case of AUTO_CONSOLIDATE Action Type.

An existing customer, Amit with dc_primary_key 1, has provided a new record having different dc_primary_key (2) and different value of city. The Master-Record is updated with the contents of the incoming record, as value of city field changes from Nagpur to Pune. An entry is made to Detail-Repository with dc_unified_id as 1001 belonging to Amit's record in Unique-Record-Repository.

Post-Action Repository Contents:
Detail-Repository:

| dc_primary_key | dc_unified_id | Name | City |
|---|---|---|---|
| 1 | 1001 | Amit | Nagpur |
| 2 | 1001 | Amit | Pune |

Master-Repository:

| dc_unified_id | Name | City |
|---|---|---|
| 1001 | Amit | Pune | d) UPDATE_NEW:

Condition:

The following conditions and their outcomes are considered for this Action Type.

Detail_Match: Satisfied
Master_Match: Not Satisfied

Action:

The following actions are performed on the matching repositories:

1. Add the record in Master-Repository with a new value of unique_id; and
2. Update the corresponding record in Detail-Repository whose dc_primary_key matches with that of the incoming record.

Example:

The given example describes the scenario in which Update_New Action Type is applied and corresponding actions are performed.

Pre-Action Repositories Contents:
Load-Repository:

| dc_primary_key | Name | City |
|---|---|---|
| 1 | Arjun | Indore |

Detail-Repository:

| dc_primary_key | dc_unified_id | Name | City |
|---|---|---|---|
| 1 | 1001 | Amit | Pune |

Master-Repository:

| dc_unified_id | Name | City |
|---|---|---|
| 1001 | Amit | Pune |

Action:

An existing customer, Amit has transferred his record to Arjun, so the record with dc_primary_key 1 in Detail-Repository, belonging to Amit gets updated with the Arjun's record. The Detail record also gets linked to the new record belonging to Arjun, created in Master-Repository, with dc_unified_id 1002. Arjun had no previously present record in Master-Repository.

The Detail-Repository record is updated with the contents of the incoming record. A new record corresponding to Arjun is created in the Unique-Record-Repository with a new value of dc_unified_id. Amit's record in Master-Repository is marked inactive, as no other record from Detail-Repository is linked to it.

Post-Action Repository Contents:
Detail-Repository:

| dc_primary_key | dc_unified_id | Name | City |
|---|---|---|---|
| 1 | 1002 | Arjun | Indore |

Master-Repository:

| dc_unified_id | Name | City |
|---|---|---|
| 1001 | Amit | Pune |
| 1002 | Arjun | Indore | e) NEW:

Condition:

The following conditions and their outcomes are considered for this Action Type.

Detail_Match: Not Satisfied
Master_Match: Not Satisfied

Action:

The following actions are performed on the matching repositories:

1. Add the record in Master-Repository, with a new value of unique_id; and
2. Add the corresponding incoming record to the Detail-Repository.

Example:

The given example describes the scenario in which Update_New Action Type is applied and corresponding actions are performed.

Pre-Action Repositories Contents:
Load-Repository:

| dc_primary_key | Name | City |
|---|---|---|
| 1 | Arjun | Pune |

Detail-Repository:

| dc_primary_key | dc_unified_id | Name | City |
|---|---|---|---|
| | | | |

Master-Repository:

| dc_unified_id | Name | City |
|---|---|---|
| | | |

Action:

A new customer, Arjun has provided his detail in the incoming record first time, so its dc_primary_key (1) is not found in Detail-Repository and its name (Arjun) is also not found in Master-Repository.

A new entry is made in the Detail-Repository corresponding to the new record. A new record corresponding to Arjun is created in the Master-Repository with a new value of dc_unified_id.

Post-Action Repository Contents:
Detail-Repository:

| dc_primary_key | dc_unified_id | Name | City |
|---|---|---|---|
| 1 | 1001 | Arjun | Pune |

Master-Repository:

| dc_unified_id | Name | City |
|---|---|---|
| 1001 | Arjun | Pune |

Figure 2A:
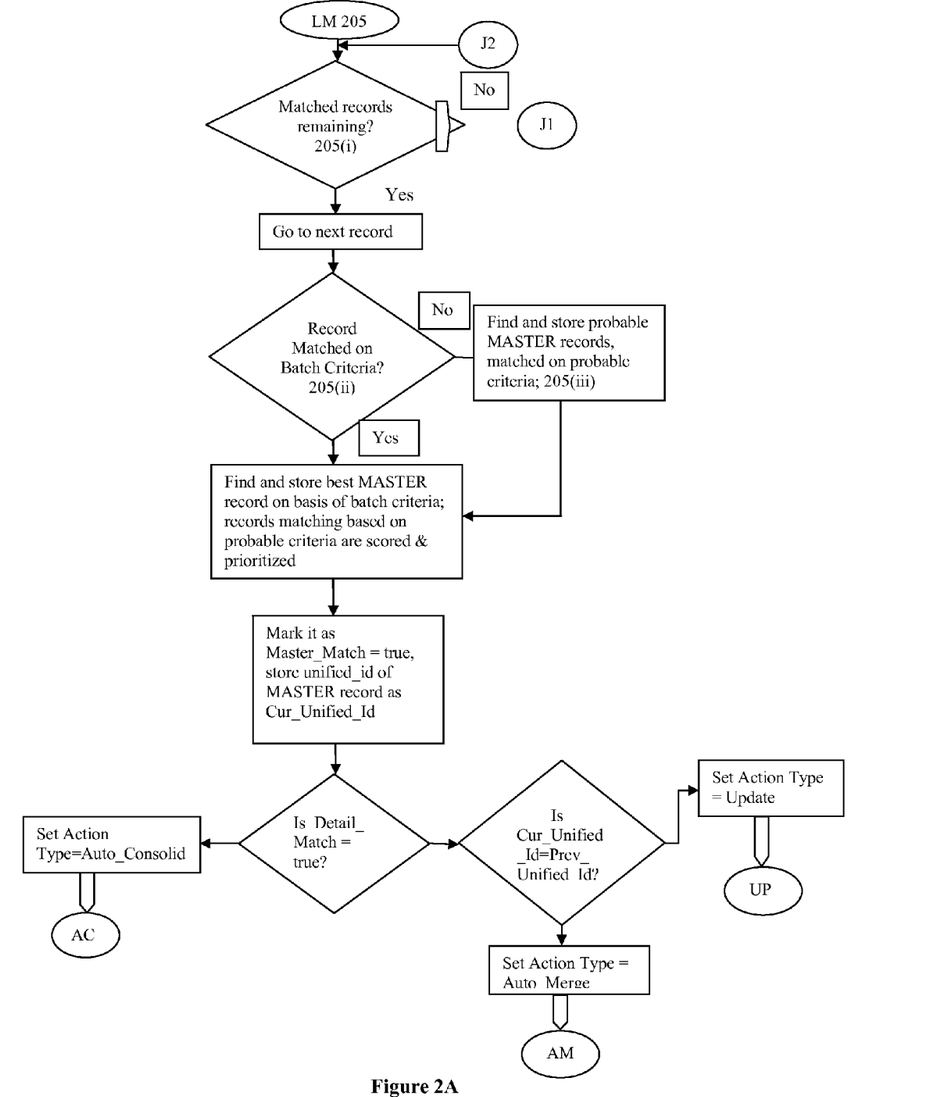
FIGS. 2(A), 2(B), 2(C) and 2(D) illustrate flow charts depicting matching conditions and various action types that are to be performed based on the matching conditions, in accordance with various embodiments of the present invention.
Figure 2B:
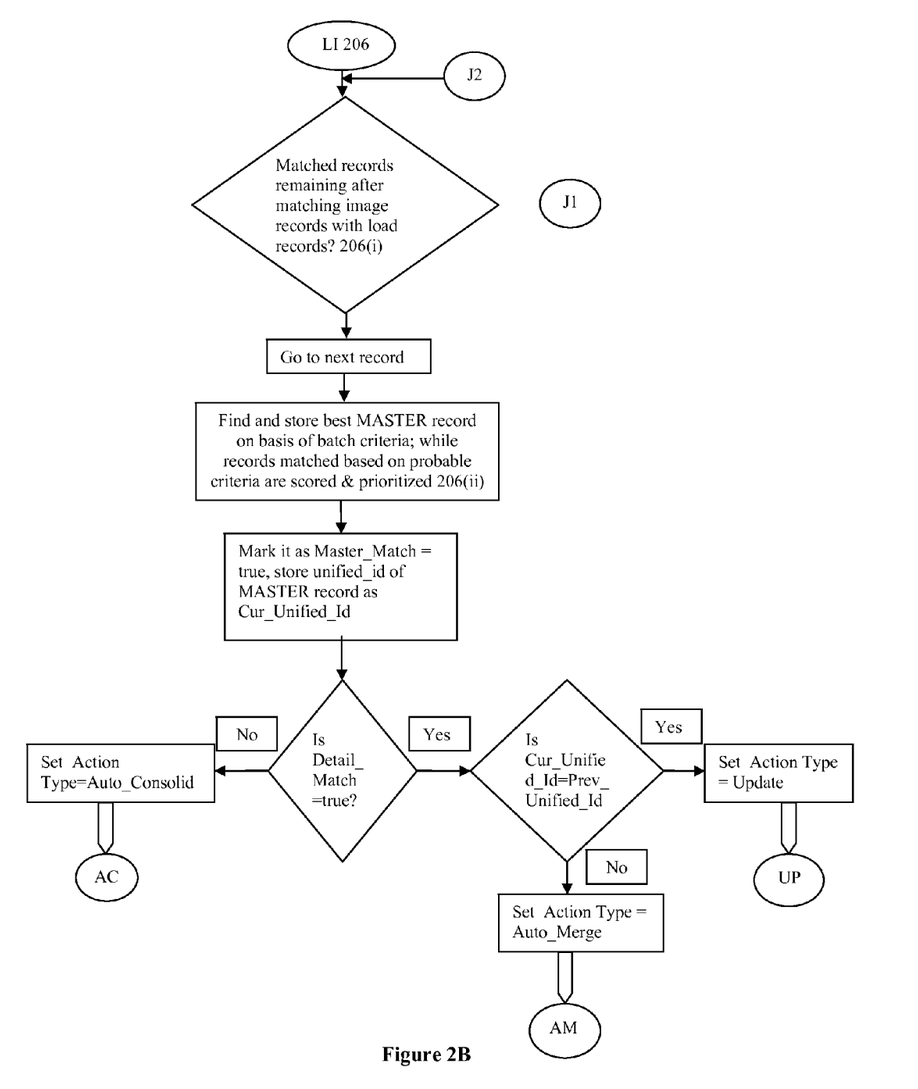
Figure 2C:
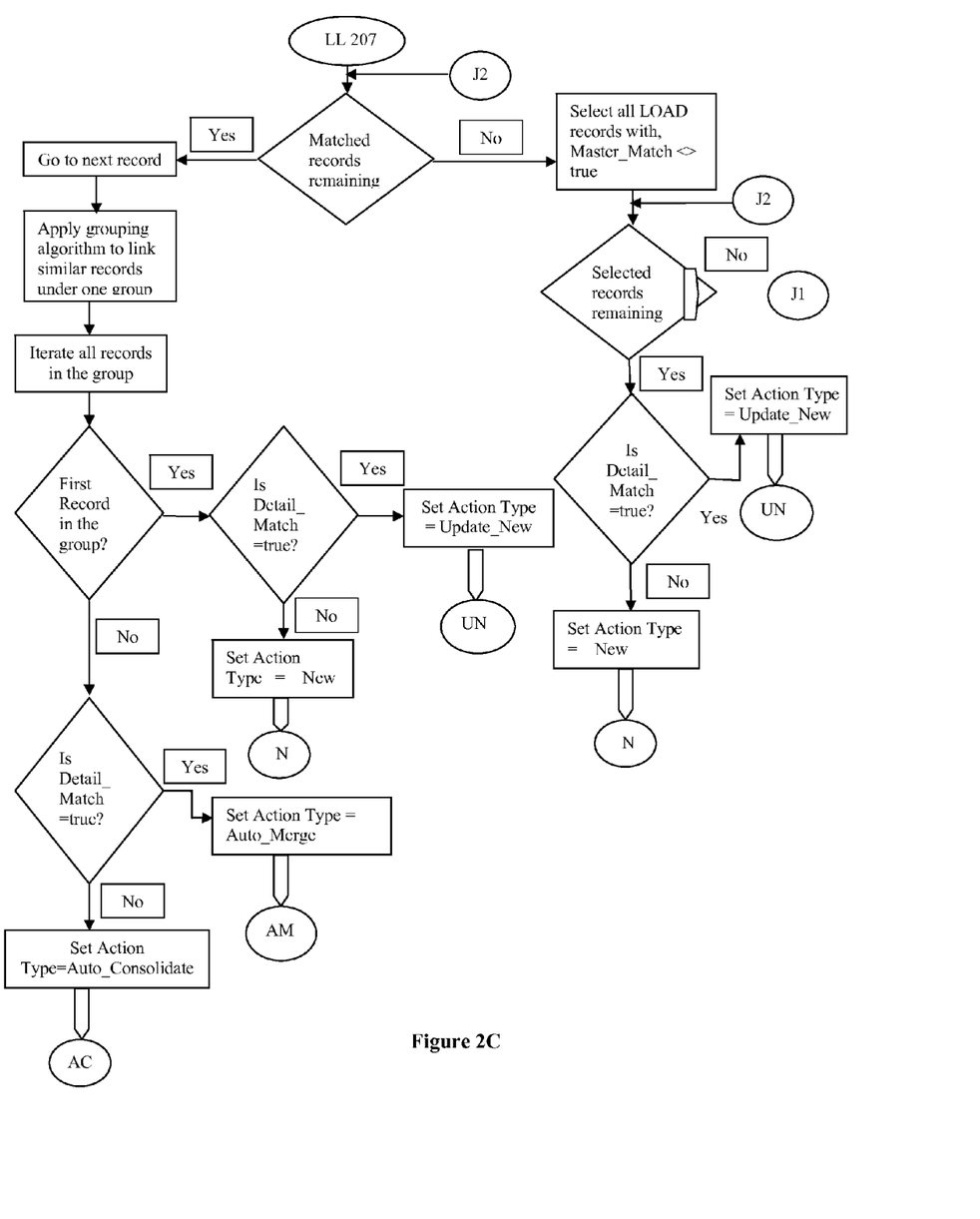

Again Referring to FIG. 2 and the matching runs to be executed, once the record is checked for any previous existing record, as shown in step 202, a Load_Master run is executed (Step 205). Discussed below are four matching runs defined for matching process in coordination with FIG. 1.

a) Load_Master Run 205: The probable records are selected on the basis of filter criteria and a join is applied between the selected records Next, the batch criterion is applied and the records satisfying said criteria are passed to determine as to which action type shall be performed. Thereon a probable criterion is applied on the remaining records of the load repository that remains unmatched in the batch criteria. FIG. 2(A) further details the process flow of Load master run and the action types performed upon it based on matching results.

b) Load_Image run 206: Image here refers to temporary representation of master repository in memory. Again the probable records are selected from Load and Image records, on the basis of given filter clause and the join is applied between Load records and Image records, for all those records which did not get match in previous Load_Master run. The Batch criterion is then applied on the selected records and the records satisfying the criteria is then subjected to a suitable Action Type. FIG. 2(B) further details the process flow of Load image run and the suitable action types performed upon it based on matching results.

c) Load_Load run: The probable records are selected from Load repository on the basis of given filter clause and the self join is applied for Load records which do not get match in Load_Master and Load_Image run. The Batch criterion is applied on the selected records, and the records satisfying the criteria are submitted for performance of suitable Action Type thereon. FIG. 2(C) further details the process flow of Load load run and the action types performed upon it based on matching results.

d) Image_Image run 208: The probable records are selected from Image records, on the basis of given filter clause and a self join is applied for all image records. The Batch criteria are applied on the selected records and the records satisfying the criteria is subjected to corresponding action type. Further, referring to FIG. 2(D) the system herein finds for any remaining matched record. For remaining matched records found, the system applies a grouping algorithm to link similar records under one group and thereon assign each record in the group a new group id with corresponding insertion into a Group list table. On the contrary, for no matching records pending, the master record is updated with the records from image table whose action type is reported as new, update new, update, auto merge or auto consolidate.

One preferred embodiment of the present invention enables the parallel processing system 103 to execute the matching run using three of its constituting modules-input 103(i), processor 103(ii) and output module 103(iii), the role of each of which in the matching run shall be discussed herein below:

a) Load_Master_Run 205: Referring to FIG. 2(A) the first matching scenario involves matching of the Load records with the Master records where the Master records are the most probable candidates for incoming records to get matched with (205(i)). The three modules used in the run and their significances are given below:

i) Input: In this module, the records of MASTER repository are fetched for the incoming LOAD records on the basis of given filter clause for applying the Match Criteria. The records fetched from this operation are passed to the Processor module.

ii) Processor: In this module, the Batch Criteria are applied for consolidating the LOAD records with the MASTER records (205(ii)). The records identified matching based on the batch criteria are considered as the best match. Probable Criteria are then applied for finding probable MASTER records for those LOAD records that did not satisfy the Batch Criteria (205(iii)). These records are scored based on their similarity and compared against a predetermined threshold score. Accordingly, the records are prioritized for subsequent deciding based on whether the records fulfill the inherent condition of matching based on given batch or probable criteria. The records satisfying any of the criteria, based on predetermined conditions, are passed to the Output module.

iii) Output: In this module, the determination of the Action Types is done and its corresponding actions are performed on the records that get matched in this run. The master_match condition is marked true for received matching records, and the records are updated with current unified id in the master repository. For updated master records, confirming if the detail_match condition also satisfies. If the detail_match condition does not satisfies, an auto consolidate operation is performed. On the contrary, for satisfied detail_matching condition, confirming if the currently updated unified_id is same as the previous unified_id. If yes, an auto merge action type is performed. Therefore, the Action Types, determined and applied for this run are UPDATE, AUTO_CONSOLIDATE and AUTO_MERGE, as the case may be.

b) Load_Image_Run 206: Referring to FIG. 2(B) the second matching scenario involves matching the IMAGE records with the LOAD records 206(i). The MASTER records that are matched with any LOAD records in LOAD_MASTER_RUN are updated with the ever incoming LOAD records and put in the IMAGE repository. The records that could not match with MASTER records in the first run, but may match with any of the updated MASTER records are processed in this run.

Figure 2D:
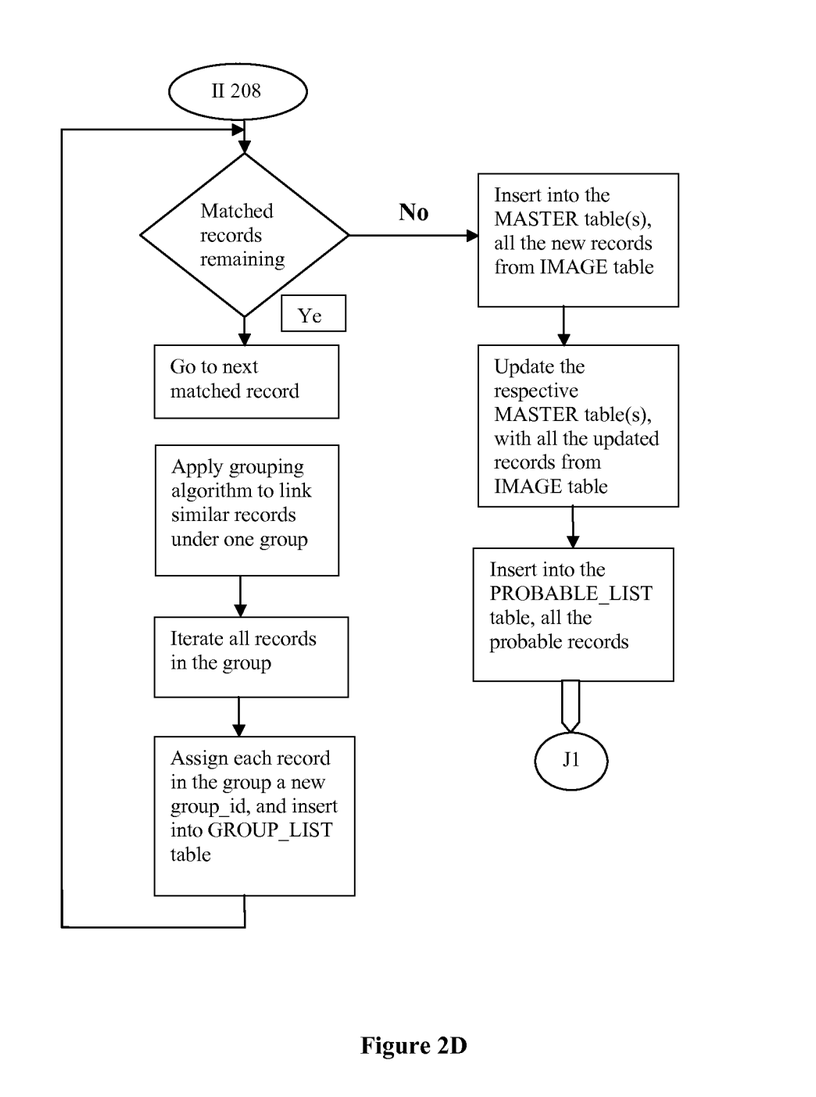

The three modules used in the run and their significances are given below:

i) Input: In this module, the records of IMAGE repository are fetched for the LOAD records on the basis of given filter clause for applying the Match Criteria. The records fetched from this operation are passed to the Processor module.

ii) Processor: In this module, the Batch Criteria are applied for consolidating the LOAD records with the updated MASTER records 206(ii). The best matching records that matched based on batch criteria are consolidated. Further, records found similar based on probable criteria are scored and prioritized based on predetermined, configurable threshold limits. The records satisfying any of the criteria are passed to the Output module.

iii) Output: In this module, the determination of the Action Types is done and its corresponding actions are performed on the records that get matched in this run. For instance, master records are first updated with current unified_id based on master_match condition and then gets verified for detail_match condition. If the detail_match condition does not hold true, auto consolidation action type is performed. Alternately, for satisfied detail_match condition, a check is performed to find if the currently updated unified id is same as previous unified id. If yes, then an update action type is performed, else auto_merge is performed. Thence, the Action Types determined in this run are UPDATE, AUTO_CONSOLIDATE and AUTO_MERGE.

c) Load_Load Run 207: Referring to FIG. 2(C) the third matching scenario involves matching the LOAD records with the records of LOAD repository itself. The LOAD records which did not get matched with either MASTER records or updated MASTER records in the previous two runs are matched in this run to find out if the LOAD itself consist any duplicate records. The three modules used in the run and their significances are given below:

i) Input: In this module the records of LOAD repository are fetched from within the repository on the basis of given filter clause for applying the Match Criteria. The records fetched from this operation are then passed to the Processor module.

ii) Processor: In this module, the Batch Criteria are applied for consolidating the LOAD records with records in the LOAD repository. The records satisfying any of the criteria are passed to the Output module.

iii) Output: In this module, the determination of the Action Types is done and its corresponding actions are performed on the records that get matched in this run. The Action Types, determined in this run are AUTO_CONSOLIDATE, AUTO_MERGE, UPADTE_NEW and NEW.

d) Image_Image Run 208: Referring to FIG. 2D, the fourth matching scenario involves matching the IMAGE records with the records of IMAGE repository itself. In this run only the reporting of the matched records is done and no Action Types are determined. No LOAD records are involved in this run as all the LOAD records are matched in the previous three runs. This run is used to flag those updated MASTER records (IMAGE records) that may have started matching with each other due to some updates performed in the records during previous three runs.

i) Input: In this module the records of IMAGE repository are fetched from within the repository on the basis of given filter clause for applying the Match Criteria. The records fetched from this operation are passed to the Processor module.

ii) Processor: In this module the Batch Criteria are applied for consolidating the IMAGE records with records in the IMAGE repository. The records are checked to find if any of the matching records are still left unmapped and unmatched. If such records exist, a grouping algorithm is applied to link similar records under one group. All records in the group are iterated and each record in the group is assigned a new group id and then is inserted into a group_list table. The records satisfying any of the criteria are passed to the Output module.

iii) Output: In this module the matched records are reported for the user to take decision on whether the reported MASTER records should be merged as one or left as two different MASTER records. For this, the master tables are updated with new records from image table and all the probably matching master records are then inserted in to the probable_list table.

The disclosed embodiments are merely exemplary of the invention, which may be embodied in various forms. The disclosed systems and methods may enable creating and managing a data repository containing unique data objects. They may further help to reduce redundant, duplicate data records in the repository thereby saving huge operational costs. They may further provide a data de-duplication and matching process in real time to maintain a unique and updated data repository. They may provide a unified view of master data record based on similar data matching process to enable better business decisions. They may enable performing of action types following the matching process in real time to keep the most updated version of repository containing unique data records.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "executing" or "verifying" or "validating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage or transmission.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method of managing and updating a data repository in real time, comprising:
retrieving at least one record from a stream of incoming records maintained in a load repository, wherein the at least one record is associated with a unique identifier;

matching at least one record with a previous record history maintained in a detail repository based on the unique identifier;

determining an action type to be performed corresponding to the at least one record, wherein the action type is determined based on an output of a matching condition, wherein the matching condition corresponds to performing a detail match, a master match, and a same master match sequentially, and wherein the detail match is performed by matching an incoming record with at least one of the previous record history, the master match is performed by matching the incoming record with at least one of a previous master record history maintained in a master repository using a predefined matching criteria, and the same master match is performed by matching an output of the detail match with an output of the master match, wherein the output of the detail match corresponds to a unique identifier of the matched previous record in the detail repository and the output of the master match corresponds to a unique identifier of matched master record in the master repository and wherein the output of the matching condition corresponds to output of the same master match;

performing the action type on the at least one record based on the determination thereby providing a unique and updated record for all matching records in the data repository, wherein the action type is one of an update action, an auto merge action, an auto consolidate action, an update new action and a new action; and wherein the predefined matching criteria comprises a batch matching criterion to obtain a best match for the at least one record in the master repository and a probable matching criterion to obtain a probable master record for the at least one record in the master repository.

2. The method of claim 1, wherein the detail repository is configured to maintain the history of all the incoming data record along with the unique identifier.

3. The method of claim 1, wherein the action types include at least one of:

for the at least one record satisfying the matching condition pertaining to the detail match, the master match and the same master match, performing update action characterized in updating the master repository and the detail repository with content of the at least one record;

for the at least one record satisfying the matching condition pertaining to the detail and the master match, performing the auto merge action characterized in updating the detail repository and the master repository with new content while marking previously linked master record as inactive if no other corresponding match exists for it in the detail repository;

for the at least one record satisfying the matching condition pertaining to the master match, performing the auto consolidate action characterized in adding at least one record as a new record in the detail repository while updating contents of the at least one record in the master repository;

for the at least one record satisfying the matching condition pertaining to the detail match, performing the update new action type characterized in adding the at least one record in the master repository with a new value and thereupon updating the at least one record in the detail repository; and for the at least one record not satisfying either of the detail match and the master match, performing the new action characterized in adding the at least one record as new record in the master repository and thereupon in the detail repository with new values.

4. A system for managing and updating a unique data repository in real time, the system comprising:

a load repository configured to store a stream of incoming records, each of the incoming record being associated with a unique identifier; a parallel processing system for;

matching the incoming record with a previous record history, maintained in a detail repository, based on the unique identifier;

determining an action type to be performed corresponding to the incoming record, wherein the action type is determined based on an output of a matching condition, wherein the matching condition corresponds to performing a detail match, a master match, and a same master match sequentially, and wherein the detail match is performed by matching the incoming record with at least one of the previous record history, the master match is performed by matching the incoming record with at least one of a previous master record history maintained in a master repository using a predefined matching criteria, and the same master match is performed by matching an output of the detail match with an output of the master match, wherein the output of the detail match corresponds to a unique identifier of the matched previous record in the detail repository and the output of the master match corresponds to a unique identifier of matched master record in the master repository and wherein the output of the matching condition corresponds to output of the same master match;

performing the action type on the at least one record based on the determination thereby providing a unique and updated record for all matching records in the data repository, wherein the action type is one of an update action, an auto merge action, an auto consolidate action, an update new action and a new action; and wherein the predefined matching criteria comprises a batch matching criterion to obtain a best match for the at least one record in the master repository and a probable matching criterion to obtain a probable master record for the at least one record in the master repository.

5. The system of claim 4, wherein the action type includes at least one of:

for the at least one record satisfying the matching condition pertaining to the detail match, the master and the same master match, performing the update action characterized in updating the master repository and the detail repository with content of the at least one record;

for the at least one record satisfying the matching condition pertaining to the detail match and the master match, performing the auto merge action characterized in updating the master repository and the detail repository with new content while marking previously linked master record as inactive if no other corresponding match exists for it in the detail repository;

for the at least one record satisfying the matching condition pertaining to the master match, performing the auto consolidate action characterized in adding the at least one record as a new record in the detail repository while updating contents of the at least one record in the master repository;

for the at least one record satisfying the matching condition pertaining to the detail match, performing the update new action type characterized in adding the at least one record in the master repository with a new value and thereupon updating the at least one record in the detail repository; and for the at least one record not satisfying either of the detail match and the master match, performing the new action characterized in adding the at least one record as new record in the master repository and thereupon in the detail repository with new values.

\* \* \* \* \*